United States Patent
Tzoreff et al.

(10) Patent No.: US 8,537,833 B2
(45) Date of Patent: Sep. 17, 2013

(54) METHOD OF CONTROLLING COMMUNICATION OF DATA PACKETS BASED ON DIFFERENT COMMUNICATION STANDARDS, A DUAL PLATFORM COMMUNICATION CONTROLLER AND A WIRELESS TRANSCEIVER

(75) Inventors: Yaniv Tzoreff, Jerusalem (IL); Avi Baum, Giva'at Shmuel (IL); Yariv Raveh, Tel Aviv (IL); Moshe Menachem, Holon (IL)

(73) Assignee: Texas Instruments Incorporated, Dallas, TX (US)

( * ) Notice: Subject to any disclaimer, the term of this patent is extended or adjusted under 35 U.S.C. 154(b) by 1115 days.

(21) Appl. No.: 12/347,885

(22) Filed: Dec. 31, 2008

(65) Prior Publication Data
US 2010/0165962 A1      Jul. 1, 2010

(51) Int. Cl.
*H04L 12/28*          (2006.01)

(52) U.S. Cl.
USPC .................. 370/395.42; 370/395.5; 455/41.2; 455/552.1

(58) Field of Classification Search
None
See application file for complete search history.

(56) References Cited

U.S. PATENT DOCUMENTS

| | | | |
|---|---|---|---|
| 4,635,224 A * | 1/1987 | Muller | 711/106 |
| 6,563,349 B2 * | 5/2003 | Menezes et al. | 327/99 |
| 7,949,812 B1 * | 5/2011 | Wong et al. | 710/240 |
| 2004/0116075 A1 | 6/2004 | Shoemake et al. | |
| 2008/0318630 A1 * | 12/2008 | Gil | 455/561 |
| 2010/0182981 A1 * | 7/2010 | Thoukydides et al. | 370/336 |

OTHER PUBLICATIONS

"Interrupt," http:\\dictionary.reference.com/browse/interrupt?s=t&path=/.

* cited by examiner

*Primary Examiner* — Faruk Hamza
*Assistant Examiner* — Tito Pham
(74) *Attorney, Agent, or Firm* — Alan A. R. Cooper; W. James Brady; Frederick J. Telecky, Jr.

(57) ABSTRACT

A dual platform communication controller, a method of controlling communication of data packets based on different communication standards and a wireless transceiver. In one embodiment, the dual platform communication controller includes: (1) a signal interpreter configured to recognize first data packets based on a first communication standard and second data packets based on a second communication standard and (2) a traffic manager coupled to the signal interpreter and configured to dynamically control communication of the second data packets including active second data packets and allocate bandwidth for communication of the first and second data packets.

15 Claims, 3 Drawing Sheets

METHOD OF CONTROLLING COMMUNICATION OF DATA PACKETS BASED ON DIFFERENT COMMUNICATION STANDARDS, A DUAL PLATFORM COMMUNICATION CONTROLLER AND A WIRELESS TRANSCEIVER

TECHNICAL FIELD

This application is directed, in general, to wireless communications and, more specifically, to the coexistence of data packets transmitted according to different communications standards (e.g., a Wireless Local Area Network, or WLAN) and Bluetooth® standards.

BACKGROUND

Communication devices can include functionality for transmitting and receiving data packets over two networks based on different communication standards. For example, wireless personal area networks (WPANs) may employ a Bluetooth® or an IEEE 802.15 standard in forming a personal wireless network using the 2.4 GHz ISM frequency band. This frequency band may also be employed by WLANs based on one of the IEEE 802.11 standards, as well. A Bluetooth® WPAN typically employs short-range (up to 10 meters), modest performance (up to 3 Mbps for Bluetooth® 2.0 standard), a dynamically configurable operating mode (ad hoc employing peer-to-peer networking and roaming), low power and support for both voice and data. A WLAN typically employs longer range (approximately 100 meters), higher performance (up to 54 Mbps), operating modes having either ad hoc or infrastructure structures (an access point coupled to a wired LAN), higher power and support for both voice and data.

Communication devices such as cell phones, laptop computers, personal digital assistants (PDAs), etc., may include the necessary hardware, software, and components to wirelessly transmit and receive data packets according to both the Bluetooth® communication standard and the IEEE 802.11 communication standards. Communication devices transmitting and receiving over both WLAN and WPAN often employ coexistence algorithms and interfaces to provide coordination between WLAN and Bluetooth® technologies. U.S. patent application Ser. No. 10/722,681 by Shoemake, which is incorporated herein by reference in its entirety, provides an example of a communication device transmitting and receiving data packets via two different wireless networks.

To reduce interference between the two technologies, a WLAN command line may be latched at the beginning of a Bluetooth® packet such that the decision whether to transmit or receive the Bluetooth® data packet is fixed for the entire packet. Thus, even if a WLAN data packet having a higher priority than an active Bluetooth® data packet is ready to be transmitted or received, the communication device will continue to transmit or receive the Bluetooth® data packet. What is needed in the art is improved coordination when transmitting or receiving data packets of two different wireless networks in close proximity.

SUMMARY

One aspect provides a dual platform communication controller. In one embodiment, the dual platform communication controller includes: (1) a signal interpreter configured to recognize first data packets based on a first communication standard and second data packets based on a second communication standard and (2) a traffic manager coupled to the signal interpreter and configured to dynamically control communication of the second data packets including active second data packets and allocate bandwidth for communication of the first and second data packets.

In another aspect, a method of controlling communication of data packets based on different communication standards is provided. In one embodiment, the method includes: (1) generating, at a first processor for first data packets based on a first communication standard, a transmit signal to control communication of second data packets based on a second communication standard different from the first communication standard, (2) sending the transmit signal from the first processor to a second processor for the second data packets, and (3) dynamically controlling communication of the second data packets, including active data packets, based on the transmit signal.

In yet another aspect, a wireless transceiver is disclosed. In one embodiment, the wireless transceiver includes: (1) a Bluetooth® processor configured to process the transmission and reception of Bluetooth® data packets, (2) a WLAN processor configured to process the transmission and reception of WLAN data packets and generate a transmit signal to dynamically control communication of Bluetooth® data packets including active Bluetooth® data packets and (3) a coexistence interface configured to couple the Bluetooth® processor to the WLAN processor and provide the transmit signal to the Bluetooth® processor from the WLAN processor.

BRIEF DESCRIPTION

Reference is now made to the following descriptions taken in conjunction with the accompanying drawings, in which.

DETAILED DESCRIPTION

Figure 1:
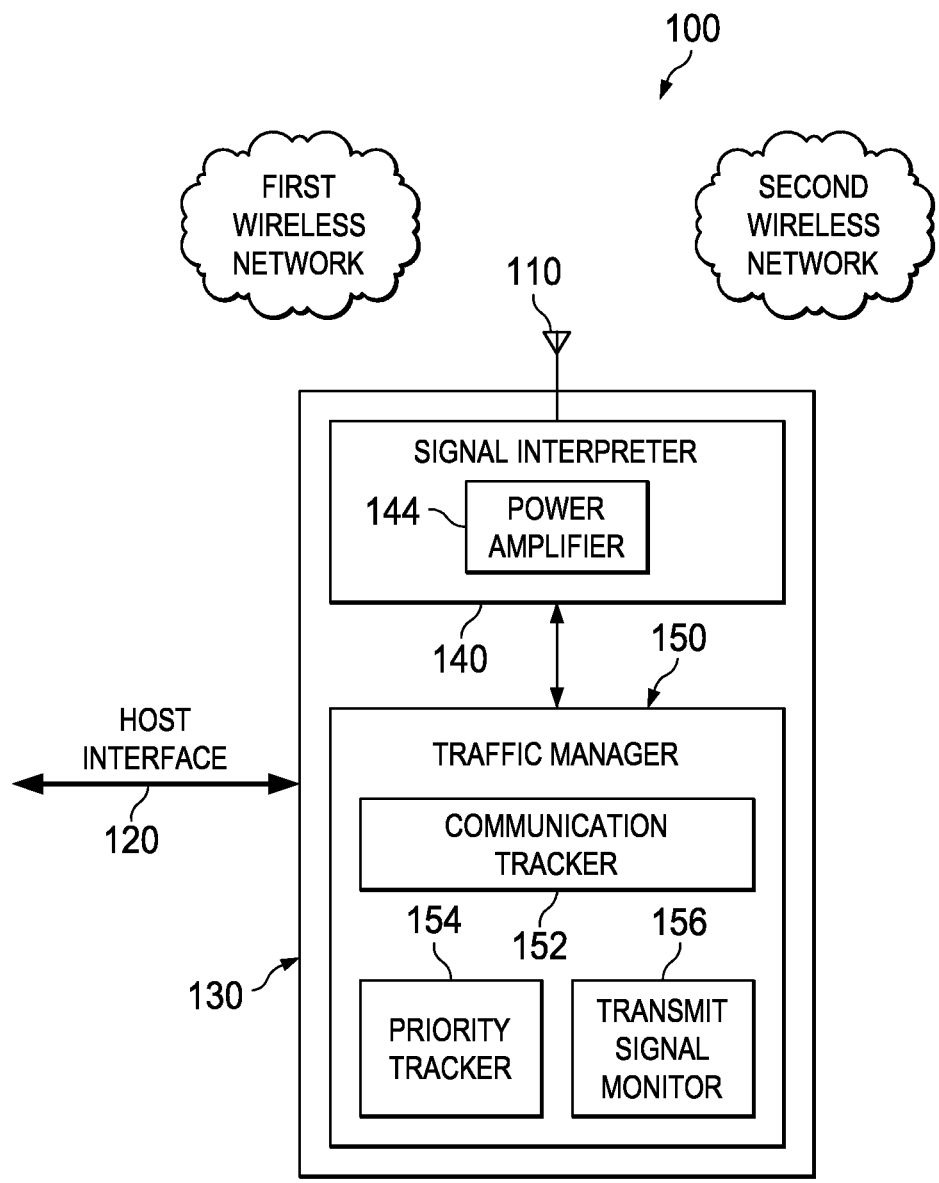
FIG. 1 is a system diagram of a wireless communication system having a dual platform communication controller constructed according to the principles of the present invention.

In conventional dual communication systems employing two networks a command line for one of the communication systems can be latched at the beginning of the transmission or reception of the other communication system. For example, when employing both a WLAN and a Bluetooth® compliant network, the WLAN command line may be latched at the beginning of transmitting or receiving (collectively referred to herein as communicating) a Bluetooth® packet such that the decision whether to transmit or receive (i.e., communicate) the Bluetooth® packet is fixed for the entire packet. Accordingly, the bandwidth allocation for either WLAN or Bluetooth® data packets is not dynamic or flexible. As such, higher prioritized WLAN tasks may be delayed based on an old decision to transmit or receive even though that decision is no longer valid.

Disclosed herein is a traffic manager configured with the flexibility to control the communication of Bluetooth® data packets even if a Bluetooth® data packet is already being communicated. The disclosed traffic manager can command a Bluetooth® processor to start or stop communicating at various moments (and not in a discrete way) regardless of whether a Bluetooth® data packet is active. An active packet is a data packet that is being transmitted or received (i.e., in the air). As such, a WLAN processor may have improved control abilities over conventional co-existent communication systems. The disclosed traffic manager, therefore, provides flexibility and ability to enhance the co-existence algorithm performances.

For example, a communication control line for commanding Bluetooth® transmissions can be asserted or de-asserted by a WLAN processor including during an active Bluetooth® data packet communication. A Bluetooth® processor can continually track this line behavior and react to the command delivered by this line whenever a change is identified. Unlike conventional systems, the WLAN command signal can be toggled while a Bluetooth® packet is active.

The Bluetooth® processor can then stop transmitting Bluetooth® data packets whenever instructed by the WLAN processor. If the command was given during an active Bluetooth® transmission, the termination of the Bluetooth® transmission can be performed in a gradual way, such as ramping the power amplifier down, to prevent any spurs. A gradual ramp-up can also be used to start transmitting.

The traffic manager of disclosed communication system includes Bluetooth®-WLAN co-existence signaling and internal mechanisms for detecting Bluetooth® high priority traffic while the WLAN is in sleep mode including Enhanced Low Power (ELP™) mode developed by Texas Instruments Inc. of Dallas, Tex. In conventional system, when the WLAN processor is awakened from a sleep mode and a Bluetooth® data packet is active, the WLAN processor does not know if the Bluetooth® activity is high priority or low. Disclosed herein is a traffic manager that includes signaling and internal mechanisms to track the priority of the Bluetooth® activity while the WLAN is in sleep mode and is only using the slow clock. In one embodiment, the Bluetooth® high priority indication will be at least longer than half a period of the slow clock.

In an always on domain of the traffic manager, a special hardware mechanism can be used to track the Bluetooth® high priority indication line and the Bluetooth® activity line with the slow clock using both rising and falling edges. In one embodiment, if the mechanism tracks the following change in half slow clock period, (both lines are logical zero or both lines are logical one), then the current Bluetooth® activity is high priority, and the value is kept in a designated register. The value will be reset when the Bluetooth® activity line is de-asserted. Thus, unlike conventional systems, the disclosed traffic manager allows a WLAN processor to have priority information of active Bluetooth® data packets when awakened from sleep mode. This provides a reduction in power consumption by increasing the time the WLAN processor can remain in sleep mode. Additionally, throughput can be enhanced by transmitting Bluetooth® data packets while the WLAN processor remains in sleep mode. Furthermore, because of the dynamic control, the traffic manager can allocate bandwidth easily between devices and the WLAN processor can receive bandwidth for crucial transactions as beacon receptions more frequently.

FIG. 1 is a system diagram of a wireless communication system 100 having a dual platform communication controller 130 constructed according to the principles of the present invention. The wireless communication system 100 is configured to operate in both a first wireless network and a second wireless network. The first wireless network may be based on a IEEE 802.11 communication standard that provides a WLAN, and a second wireless network may based on a WPAN employing a Bluetooth® communication standard. The wireless communication system 100 includes an antenna 110, a host interface 120 and a dual platform communication controller 130.

The antenna 110 is configured to communicate data packets in both the first and second wireless network. The host interface 120 is configured to transmit and receive information between the host and the dual platform communication controller 130. The host interface 120 may include a specific interface for WLAN activity and one for Bluetooth® activity. The information includes data to be transmitted or data that has been received via the antenna 110. The host may be, for example, a cell phone, a laptop computer, a PDA or a web tablet. Both the antenna 110 and the host interface 120 may be conventional components typically included in a wireless communication system.

The dual platform communication controller 130 may form a part of both the WLAN and the WPAN. The dual platform communication controller 130 includes a signal interpreter 140 and a traffic manager 150. The signal interpreter 140 is configured to recognize first data packets based on a first communication standard and second data packets based on a second communication standard. As such, the signal interpreter 140 includes the necessary RF circuitry and components, such as an RF front end, for communicating both the first and second data packets. The RF front end, for example, may include a power amplifier for transmitting the first and second data packets such as the power amplifier 144 illustrated in FIG. 1 for communicating the second data packets. The signal interpreter 140 may include additional components typically included in a wireless communication system for communicating data packets of two different communication standards.

The traffic manager 150 is coupled to the signal interpreter 140 and is configured to dynamically control communication of the second data packets. In addition to dynamically controlling communication of second data packets that are to be communicated, the traffic manager 150 dynamically controls the communication of active second data packets. The traffic manager 150 may include designated processors for controlling processing of the first data packets and the second data packets. The processors may be directed by a series of operating instructions representing algorithms (e.g., co-existence algorithms) that direct the communication via both of the communication standards. The traffic manager 150 may employ a co-existence interface to provide signaling for the co-existence of the two communication standards. The co-existence interface may include various status lines to provide the signaling such as an activity status line, a priority line and a communication control line.

The traffic manager 150 can dynamically control communication over the two communication standards by allocating bandwidth for communication of the first and second data packets. This is typically required since the WLAN and the WPAN employ the same frequency bands and occupy proximate physical spaces, in the illustrated embodiment. The traffic manager 150 is configured to allocate bandwidth for communicating the first and second data packets based on detecting active communications of the second data packets and the priority level thereof. Accordingly, the traffic manager 150 may control the operation of the power amplifier 144 based on the transmit signal.

The traffic manager 150 also includes a communication tracker 152 configured to detect active communications of the second data packets. The traffic manager 150 also includes a priority tracker 154 configured to monitor a priority level of the second data packets. The traffic manager 150 further includes a transmit signal monitor 156 configured to indicate the existence of the transmit signal.

The WLAN device will, therefore, have an internal mechanism, operational in sleep mode (operating by a slow clock which is available at all times when a battery is attached and, thus, is present during sleep mode), that will trace the Bluetooth® packet priority. Additionally, the traffic manager will include appropriate co-existence signaling that supports this mechanism. Typically, conventional systems disregard this problem and allow the Bluetooth® data packet to be communicated even if the WLAN has a higher priority task. The proposed mechanism will contain the information on the Bluetooth® packet type (high priority or not) and the WLAN processor can access the priority information whenever it wakes up. The WLAN will use this priority status in order to allocate the bandwidth to the WLAN or not.

The high priority of a Bluetooth® data packet may be determined monitoring the activity status line and the priority line. In one embodiment, if in a present two slow clock toggling (rise and fall or fall and rise) both the activity status line and the priority line are '1' (high), and in the former slow clock the two lines were '0', then the present Bluetooth® data packet is high priority. The priority value can be cleared when the activity status line is de-asserted.

Figure 2:
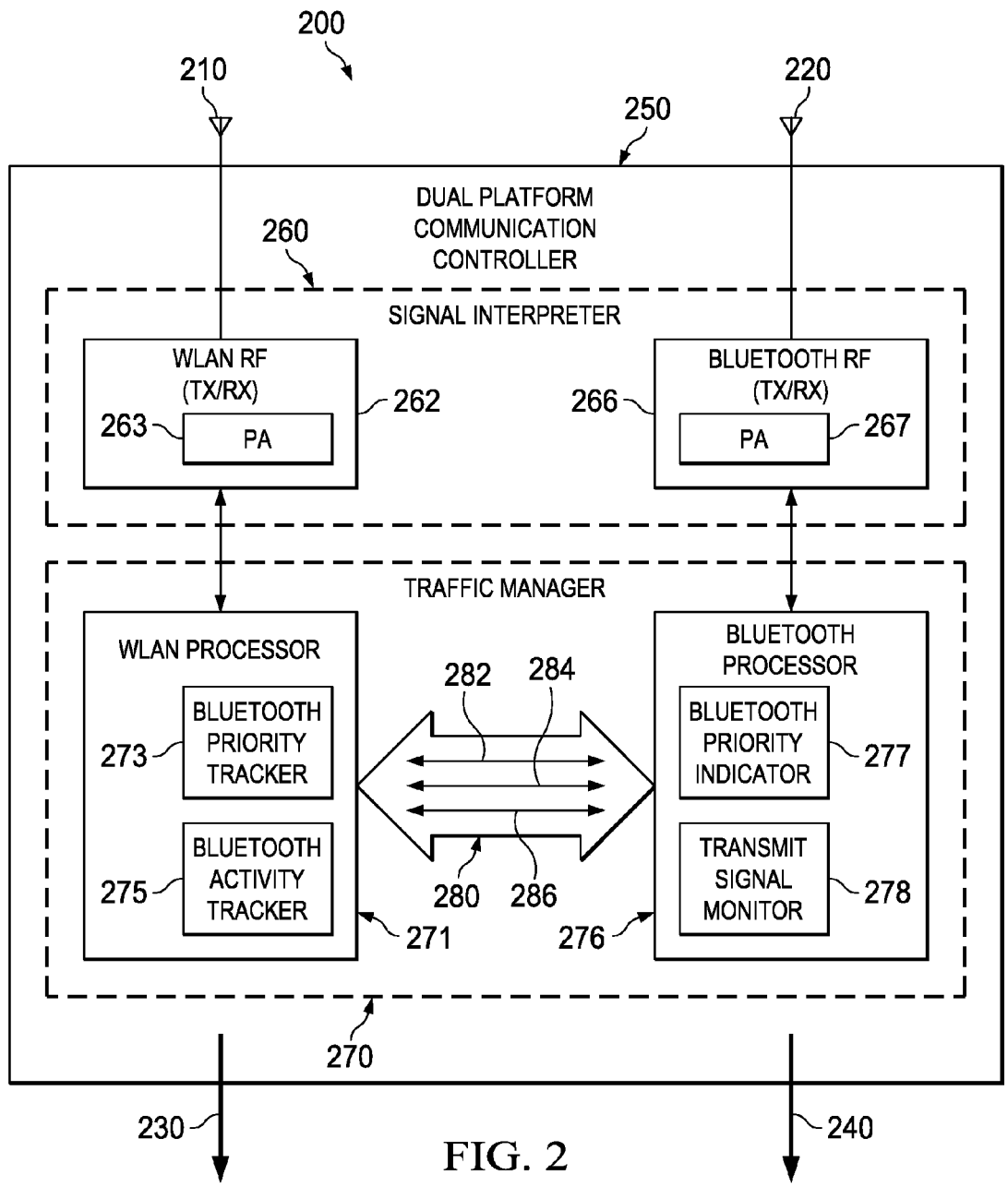
FIG. 2 is a block diagram of an embodiment of a wireless transceiver constructed according to the principles of the present invention.

FIG. 2 is a block diagram of an embodiment of a wireless transceiver 200 constructed according to the principles of the present invention. The wireless transceiver 200 includes a WLAN antenna 210, a Bluetooth® antenna 220, a WLAN host interface 230, a Bluetooth® host interface 240 and a dual platform communication controller 250. The wireless transceiver 200 may be a cell phone capable of communicating via a WLAN and a Bluetooth® network. The WLAN antenna 210, the Bluetooth® antenna 220, the WLAN host interface 230 and the Bluetooth® host interface 240 may be conventional devices typically used in a wireless transceiver capable of communicating over dual wireless networks.

The dual platform communication controller 250 includes a signal interpreter 260 and a traffic manager 270. The signal interpreter 260 is configured to recognize WLAN data packets and Bluetooth® data packets. As such, the signal interpreter 260 includes a WLAN RF front end 262 including a power amplifier 263 and a Bluetooth® RF front end 266 including a power amplifier 267. The signal interpreter 260 may include additional components typically included in a wireless communication system for communicating WLAN and Bluetooth® data packets.

The traffic manager 270 includes a WLAN processor 271, a Bluetooth® processor 276. The WLAN processor 271 includes a Bluetooth® priority tracker 273 and a Bluetooth® activity tracker 275. The Bluetooth® processor 276 includes a Bluetooth® priority indicator 277 and a transmit signal monitor 278. The traffic manager 270 also includes a coexistence interface 280 that is used to couple the WLAN processor 271 to the Bluetooth® processor 276.

The Bluetooth® processor 276 is configured to process the transmission and reception of Bluetooth® data packets. The Bluetooth® processor 276 is configured to direct the Bluetooth® power amplifier 267 to ramp-down in response to detection of the transmit signal by a transmit signal monitor 278. The transmit signal monitor 278 is configured to monitor the coexistence interface 280 to detect a transmit signal on communication control line 282 of the coexistence interface 280 and direct communication of the Bluetooth® data packets based thereon. The Bluetooth® processor 276 also includes a Bluetooth® priority indicator 277 configured to transmit the priority status of active Bluetooth® data packets to the WLAN processor 271.

The WLAN processor 271 is configured to process the communication of WLAN data packets and generate the transmit signal to dynamically control communication of Bluetooth® data packets including active Bluetooth® data packets. The WLAN processor 271 includes a Bluetooth® priority tracker 273 configured to monitor a Bluetooth® priority line 284 of the coexistence interface 280. Additionally, the WLAN processor 271 includes a Bluetooth® activity tracker 275 configured to monitor the priority status of Bluetooth® data packets on a Bluetooth® activity line 286 of the coexistence interface 280. Both the Bluetooth® priority tracker 273 and the Bluetooth® activity tracker 275 monitor the Bluetooth® priority line 284 the Bluetooth® activity line 286 while in a sleep mode. The WLAN processor 271 is configured to allocate bandwidth to communicate the WLAN data packets and the Bluetooth® data packets based on data on both the Bluetooth® priority indicator and the Bluetooth® activity line. If the Bluetooth® data has a lower priority than the WLAN data, then the WLAN processor 271 can terminate the Bluetooth® activity and allocate the bandwidth that was being used for the Bluetooth® data packets for the WLAN data packets.

The coexistence interface 280 is configured to couple the Bluetooth® processor 276 to the WLAN processor 271 and provide signaling therebetween to coordinate the coexistence of communication over a WLAN and a Bluetooth® network. In addition to the communication control line 282, the Bluetooth® priority line 284 and the Bluetooth® activity line 286, the coexistence interface 280 may include additional communication lines that are typically used to transmit signals to coordinate the co-existing operation of communicating WLAN and Bluetooth® data packets. Assertion or de-assertion on the various communication lines of the communication interface, including the communication control line 282, the Bluetooth® priority line 284 and the Bluetooth® activity line 286, may be used to transmit the corresponding signals generated by the WLAN processor 271 or the Bluetooth® processor 276.

Figure 3:
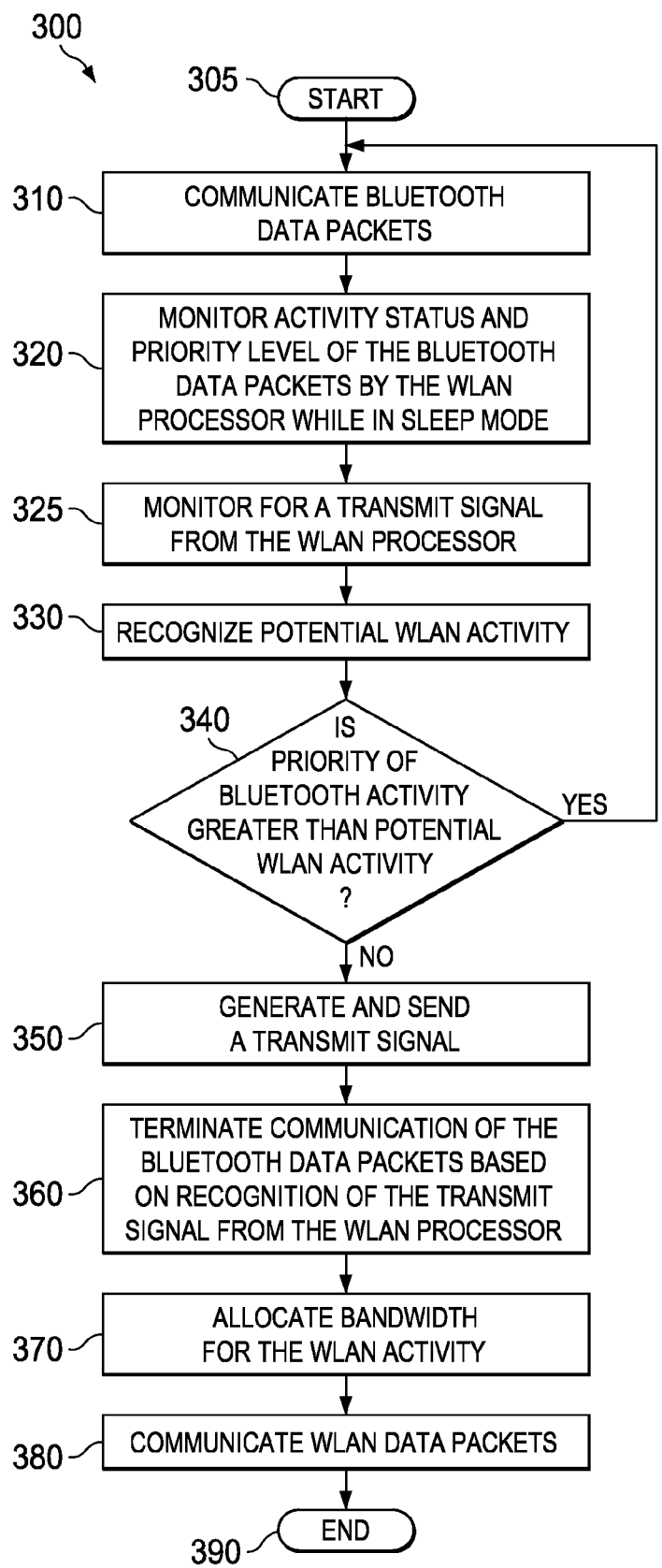
FIG. 3 is a flow diagram of an embodiment of a method of controlling communication of data packets based on different communication standards carried out according to the principles of the present invention.

FIG. 3 is a flow diagram of an embodiment of a method 300 of controlling communication of data packets based on different communication standards carried out according to the principles of the present invention. In FIG. 3, a WLAN and a Bluetooth® network are used to represent the two different communication standards. The method may be carried out at least in part by a dual platform communication controller having a traffic manager with a WLAN processor and a Bluetooth® processor coupled together by a coexistence interface. The dual platform communication controller may form part of a wireless communication system such as a cell phone. In a step 305 the method 300 begins.

The method 300 continues in a step 310 with the communication of Bluetooth® data packets. The Bluetooth® data packets may be in the process of being transmitted or in the process of being received. The communication of the Bluetooth® data packets may be carried out in a conventional manner well known in the art.

In a step 320, the WLAN processor monitors the activity status of the Bluetooth® data packets and the priority level thereof while the WLAN processor is in a sleep mode. While in the sleep mode, the WLAN processor uses a slow clock and consumes less power. In some embodiments, the WLAN processor may be in ELP™ mode.

To determine the activity status, the WLAN processor may monitor an activity line of the coexistence interface. Additionally, the priority level of active Bluetooth® data packets may be sent via a priority line of the coexistence interface. The activity status and priority level may be generated and sent to the WLAN over the activity line and the priority line by the Bluetooth® processor. The priority level of the Bluetooth® activity can be stored in a register associated with the WLAN processor. When the Bluetooth® activity is deactivated, the priority level may be reset by the WLAN processor.

Additionally, the Bluetooth® processor monitors for a transmit signal in a step 325. A transmit signal may be generated and sent by the WLAN processor in order to dynamically control communication of Bluetooth® data packets. The Bluetooth® processor may look for the transmit signal by monitoring for assertion or de-assertion of a communication priority line of the coexistence interface.

While monitoring in sleep mode, potential WLAN activity is recognized in a step 330. The WLAN activity may be recognized due to a signal on the WLAN command line associated with the WLAN processor. The WLAN activity may be WLAN data packets to receive or to transmit. Recognizing the potential WLAN data packets to communicate awakens the WLAN processor from sleep mode.

A determination is then made if the Bluetooth® activity has a higher priority level than the potential WLAN activity in a first decisional step 340. Since the WLAN processor has already been monitoring Bluetooth® activity and priority while in sleep mode, the WLAN processor already knows the priority level of the active Bluetooth® data packets when awakened.

If the Bluetooth® activity is at a higher priority, then the communication of the Bluetooth® data packets continues as in step 310. If the Bluetooth® activity is not a high priority, then the WLAN processor generates a transmit signal and sends the transmit signal to the Bluetooth® processor in a step 350. The transmit signal may be sent on a communication control line of the coexistent interface.

Upon recognition of the transmit signal, the Bluetooth® processor terminates the communication of the Bluetooth® data packets in a step 360. The Bluetooth® processor may terminate the communication of the Bluetooth® data packets by instruction a power amplifier of a Bluetooth® RF front end to shut down. A command line for controlling the power amplifier may be asserted or de-asserted to provide control. In some embodiments, the power amplifier may be powered-down gradually (i.e., ramp-down) to prevent spurious transmissions. The transmit signal, therefore, can be used to dynamically control communication of the Bluetooth® data packets including active Bluetooth® data packets. This allows the WLAN processor to have increased control compared to conventional systems by stopping or starting communication of Bluetooth® data packets even when active.

After terminating the communication of the Bluetooth® data packets, the WLAN processor allocates bandwidth for the communication of the potential WLAN data packets in a step 370. As such, bandwidth that was allocated for the active Bluetooth® data packets can now be used for the WLAN data packets. As such, bandwidth can be allocated to communicate the WLAN data packets and the Bluetooth® data packets based on the activity and the priority level of the Bluetooth® data packets.

The WLAN data packets can then be communicated in a step 380. Communication of the Bluetooth® data packets may then continue thereafter if needed. The method 300 ends in a step 390.

Those skilled in the art to which this application relates will appreciate that other and further additions, deletions, substitutions and modifications may be made to the described embodiments.

What is claimed is:

1. A dual platform communication controller for use with a wireless communication system, comprising:
    a signal interpreter configured to recognize first data packets based on a first communication standard and second data packets based on a second communication standard, wherein said first communication standard is IEEE 802.11 and said second communication standard is a Bluetooth® communication standard,
    a Bluetooth® processor configured to process the transmission and reception of Bluetooth® data packets,
    a WLAN processor configured to process the transmission and reception of WLAN data packets and generate a transmit signal to dynamically control communication of Bluetooth® data packets including active Bluetooth® data packets; and
    a traffic manager coupled to said signal interpreter and configured to dynamically control communication of said second data packets including active second data packets and allocate bandwidth for communication of said first and second data packets,
    wherein said traffic manager includes a transmit signal monitor configured to indicate the existence of said transmit signal,
    wherein said traffic manager is configured to monitor an activity and priority of said second data packets by said second processor while said first processor is in a sleep mode,
    wherein said sleep mode is defined as having at least a slower clock for said first processor than in a non-sleep mode for said first processor,
    wherein said traffic manager includes a coexistence interface configured to couple said Bluetooth® processor to said WLAN processor,
    wherein said coexistence interface includes a Bluetooth® priority indicator and a Bluetooth® activity line,
    wherein said WLAN processor includes a Bluetooth® tracker configured to monitor said Bluetooth® priority indicator and said Bluetooth® activity line in said sleep mode,
    wherein a Bluetooth® high priority indication will be at least longer than half a period of the slower clock,
    wherein said traffic monitor is further configured to allocate bandwidth to communicate said first and second data packets based on said activity of said second data packets and said priority level of said second data packets,
    wherein said priority level of said first data packets can override said activity level of said second data packets,
    wherein said dynamically controlling includes allocating bandwidth for communication of the first and second data packets based on said transmit signal that denotes at least said priority level of said second packets, and
    wherein the traffic manager can interrupt the transmission of a lower priority Bluetooth® data packet with a higher priority WLAN packet, regardless of whether a Bluetooth® data packet is active, based at least on said priority levels.

2. The controller as recited in claim 1 wherein said signal interpreter includes a power amplifier for communicating said second data packets and operation of said power amplifier is controlled based on said transmit signal.

3. The controller as recited in claim 1, wherein the WLAN processor is configured to recognize potential WLAN data packets to awaken the WLAN processor from the sleep mode.

4. The controller as recited in claim 3, wherein dynamically controlling includes allocating bandwidth for communication of the first and second data packets based on said transmit signal that denotes at least said priority level the first packets.

5. The controller as recited in claim 1, wherein a termination of the Bluetooth® data packets can occur with a ramping of the power amplifier down.

6. A method of controlling communication of data packets based on different communication standards, comprising:
generating, at a first processor for first data packets based on a first communication standard, a transmit signal to control communication of second data packets based on a second communication standard different from said first communication standard, wherein said first communication standard is IEEE 802.11 and said second communication standard is a Bluetooth® communication standard,
processing the transmission and reception of Bluetooth® data packets,
processing the transmission and reception of WLAN data packets and generate a transmit signal to dynamically control communication of Bluetooth® data packets including active Bluetooth® data packets;
traffic monitoring an activity and priority of said second data packets by said second processor while said first processor is in a sleep mode,
wherein said sleep mode is defined as having at least a slower clock for said first processor than in a non-sleep mode for said first processor,
wherein said first processor includes a Bluetooth® tracker configured to monitor a Bluetooth® priority indicator and a Bluetooth® activity line in said sleep mode,
wherein a Bluetooth® high priority indication will be at least longer than half a period of the slower clock,
wherein said traffic monitoring further includes allocate bandwidth to communicate said first and second data packets based on said activity of said second data packets and said priority level of said second data packets,
wherein said priority level of said first data packets can override said activity level of said second data packets,
sending said transmit signal from said first processor to a second processor for said second data packets; and
dynamically controlling communication of said second data packets, including active data packets, based on said transmit signal,
wherein said dynamically controlling includes allocating bandwidth for communication of the first and second data packets based on said transmit signal that denotes at least said priority level of said second packets,
wherein said dynamically controlling further includes interrupt the transmission of a lower priority Bluetooth® data packet with a higher priority WLAN packet, regardless of whether a Bluetooth® data packet is active, based at least on said priority levels.

7. The method as recited in claim 6 further comprising storing said priority level of said second data packets.

8. The method as recited in claim 7 further comprising resetting said priority level when said activity is deactivated.

9. The method as recited in claim 6, further comprising recognizing potential WLAN data packets to awaken the WLAN processor from the sleep mode.

10. The method as recited in claim 6, further comprising, wherein dynamically controlling includes allocating bandwidth for communication of the first and second data packets based on said transmit signal that denotes at least said priority level the first packets.

11. The method as recited in claim 6, wherein a termination of the Bluetooth® data packets can occur with a ramping of a power amplifier down.

12. A wireless transceiver, comprising:
a Bluetooth® processor configured to process the transmission and reception of Bluetooth® data packets;
a WLAN processor configured to process the transmission and reception of WLAN data packets and generate a transmit signal to dynamically control communication of Bluetooth® data packets including active Bluetooth® data packets; and
a coexistence interface configured to couple said Bluetooth® processor to said WLAN processor and provide said transmit signal to said Bluetooth® processor from said WLAN processor,
wherein said coexistence interface is configured to monitor an activity of said second data packets by said second processor while said first processor is in a sleep mode, wherein said sleep mode is defined as having at least a slower clock for said first processor than in a non-sleep mode for said first processor,
wherein said coexistence interface includes a Bluetooth® priority indicator and a Bluetooth® activity line,
wherein said WLAN processor includes a Bluetooth® tracker configured to monitor said Bluetooth® priority indicator and said Bluetooth® activity line in sleep mode,
wherein a Bluetooth® high priority indication will be at least longer than half a period of the slower clock,
wherein said coexistence interface is further configured to allocate bandwidth to communicate said first and second data packets based on said activity of said second data packets and said priority level of said second data packets,
wherein said priority level of said first data packets can override said activity level of said second data packets
wherein said dynamically controlling includes allocating bandwidth for communication of the first and second data packets based on said transmit signal that denotes at least said priority level of said second packets, and
wherein said dynamically controlling further includes interrupt the transmission of a lower priority Bluetooth® data packet with a higher priority WLAN packet, regardless of whether a Bluetooth® data packet is active, based at least on said priority levels.

13. The wireless transceiver as recited in claim 12 wherein said Bluetooth® processor includes a transmit signal monitor configured to monitor said coexistence interface to detect said transmit signal and direct communication of said Bluetooth® data packets based thereon.

14. The wireless transceiver as recited in claim 13 further comprising a Bluetooth® power amplifier, wherein said Bluetooth® processor is configured to direct said Bluetooth® power amplifier to ramp-down in response to detection of said transmit signal by said transmit signal monitor.

15. The wireless transceiver as recited in claim 12 wherein said WLAN processor allocates bandwidth to communicate said WLAN data packets based on data on both said Bluetooth® priority indicator and said Bluetooth® activity line.

* * * * *